United States Patent [19]

Stevens

[11] Patent Number: 4,720,236

[45] Date of Patent: Jan. 19, 1988

[54] COOLABLE STATOR ASSEMBLY FOR A GAS TURBINE ENGINE

[75] Inventor: Leonard W. Stevens, East Hampton, Conn.

[73] Assignee: United Technologies Corporation, Hartford, Conn.

[21] Appl. No.: 684,821

[22] Filed: Dec. 21, 1984

[51] Int. Cl.⁴ .............................................. F02C 3/00
[52] U.S. Cl. .................... 415/136; 415/116; 415/134
[58] Field of Search ............... 415/134, 136, 138, 139, 415/216, 137, 115, 116, 189, 191, 193

[56] References Cited

U.S. PATENT DOCUMENTS

| | | | |
|---|---|---|---|
| 3,443,791 | 5/1969 | Sevetz et al. | 415/216 |
| 4,017,213 | 4/1977 | Przirembel | 415/115 |
| 4,176,433 | 12/1979 | Lee et al. | 415/189 |
| 4,300,868 | 11/1981 | Wilkinson et al. | 415/137 |
| 4,384,822 | 5/1983 | Schweikl et al. | 415/137 |
| 4,485,620 | 12/1984 | Koenig et al. | 415/136 |

FOREIGN PATENT DOCUMENTS

| | | |
|---|---|---|
| 893579 | 4/1962 | United Kingdom . |
| 924333 | 4/1963 | United Kingdom . |
| 2061396 | 5/1983 | United Kingdom . |

Primary Examiner—Robert E. Garrett
Assistant Examiner—John Kwon
Attorney, Agent, or Firm—Gene D. Fleischhauer

[57] ABSTRACT

A stator assembly 18 for a gas turbine engine is disclosed. Various construction details relating to the mounting of a stator vane 42 in the engine are developed. In one embodiment, the vane is: bolted at a downstream flange 112 of the vane to an inner support 54; radially splined to a support such as the outer support 56 at an upstream flange 125 which is spaced axially from the downstream flange; and, is adapted to slidably engage the outer support to provide sealing contact between the vane and the remainder of the engine.

5 Claims, 5 Drawing Figures

FIG. 4
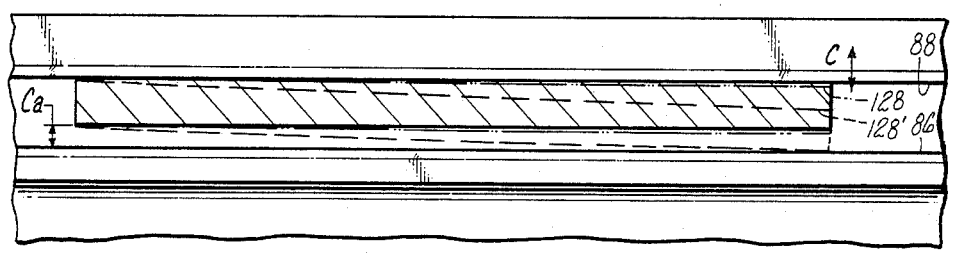
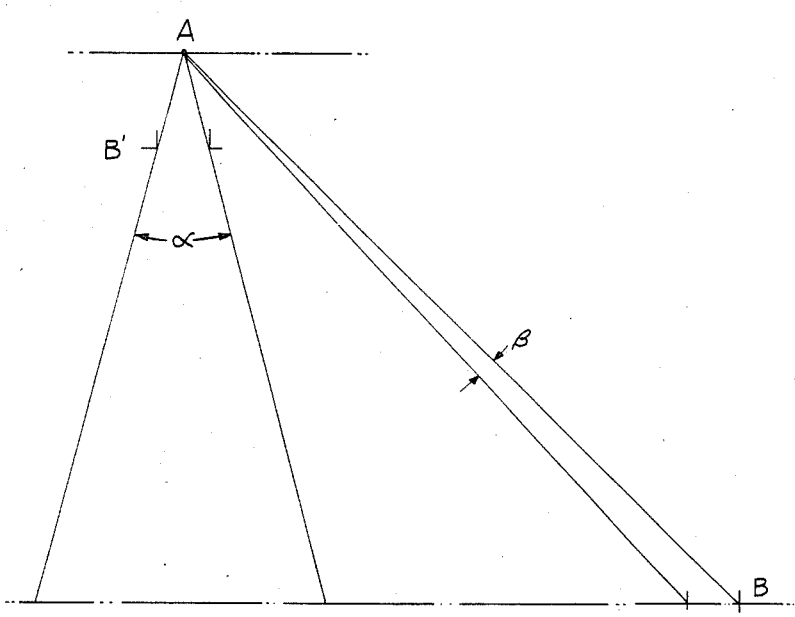
FIG. 5

COOLABLE STATOR ASSEMBLY FOR A GAS TURBINE ENGINE

CROSS REFERENCE TO RELATED APPLICATION

This application relates to U.S. application Ser. No. 684,656 filed Dec. 21, 1984 for COOLABLE STATOR ASSEMBLY FOR A GAS TURBINE ENGINE by Leonard W. Stevens et al.

TECHNICAL FIELD

This invention relates to axial flow rotary machines of the type having a flow path for working medium gases. More particularly, the invention is about an array of stator vanes, a support for the array of stator vanes and a leak path for cooling air which extends near the working medium flow path. Although this invention was conceived during work in the field in axial flow, gas turbine engines, the invention has application to other fields which employ rotary machines.

BACKGROUND ART

An axial flow, gas turbine engine typically has a compression section, a combustion section, and a turbine section. An annular flow path for working medium gases extends axially through these sections of the engine. A stator assembly extends about the annular flow path for confining the working medium gases to the flow path and for directing the working medium gases along the flow path.

As the gases are passed along the flow path, the gases are pressurized in the compression section and burned with fuel in the combustion section to add energy to the gases. The hot, pressurized gases are expanded through the turbine section to produce useful work. A major portion of this work is used as output power, such as for driving a free turbine or developing thrust for an aircraft.

A remaining portion of the work generated by the turbine section is not used for output power. Instead, this portion of the work is used in the compression section of the engine to compress the working medium gases. The engine is provided with a rotor assembly for transferring this work from the turbine section to the compression section. The rotor assembly has arrays of rotor blades in the turbine section for receiving work from the working medium gases. The rotor blades have airfoils that extend outwardly across the working medium flow path and that are angled with respect to the approaching flow to receive work from the gases and to drive the rotor assembly about the axis of rotation. The stator assembly has arrays of stator vanes which extend inwardly across the working medium flow path between the arrays of rotor blades. The stator vanes direct the approaching flow to the rotor blades at a desired angle.

The stator asesmbly further includes an outer case and arrays of wall segments supported from the outer case which extend circumferentially about the working medium flow path. The wall segments are located adjacent to the working medium flow path for confining the working medium gases to the flow path. These wall segments have radial faces which are circumferentially spaced leaving a clearance gap G therebetween. The clearance gap is provided to accommodate changes in diameter of the array of wall segments in response to operative conditions of the engine as the outer case is heated and expands or is cooled and contracts.

Examples of stator vanes used of modern gas turbine engines are shown in U.S. Pat. No. 3,989,410 issued to Ferrari entitled "Labyrinth Seal System" and U.S. Pat. No. 4,005,946 issued to Brown et al. entitled "Method and Apparatus for Controlling Stator Thermal Growth." In these constructions, the first array of stator vanes in the turbine section extends axially between the first array of rotor blades and the downstream end of the combustion chamber. In these engines, thin sheet metal seals extend between the combustion chamber and the stator vane to bound the working medium flow path. The stator vane is most advantageously rigidly bolted to either an outer support or an inner support which extend from the outer case to support the stator vane. Because of differences in thermal expansion between the inner and outer case in the radial and in the axial directions, the vane cannot be securely tied to both the inner and outer case and must be free to permit relative movement between the inner support and the outer support.

The stator vane in Brown is bolted rigidly to the outer support and slidably engages the inner support in the radial direction. The leading edge region of the support is essentially unsupported in that it carries flexible sheet metal material that join the vane to the combustion section, such as the sheet metal member 20. The vane structure shown in Ferrari is supported in a like manner being bolted at the outer support and slidably engaging the inner support at annular flange. Cooling air is ducted through an upstream conduit 48 in Brown to the stator vane to provide cooling to the interior of the stator vane. This cooling air is ducted rearwardly to downstream locations in the gas turbine engine for further cooling of adjacent portions of the engine, such as outer air seal segments. Accordingly, it is desirable to have tight sealing contact between adjacent components of the engine to prevent the leakage of cooling air into the working medium flow path.

Although the use of cooling air is accepted because it increases the service life of the airfoils of the stator vanes in comparison to uncooled airfoils, the use of cooling air decreases the operating efficiency of the engine. This decrease occurs because a portion of the engine's useful work is used to pressurize the cooling air in the compression section decreasing the amount of useful work available for output power. One way to increase operating efficiency is to decrease the leakage of cooling air from the cooling air flow paths in the engine. Another way to increase operating efficiency is to more effectively use the cooling air so that increased cooling is provided by the same amount of cooling air or so that the same amount of cooling is provided with a decreased amount of cooling air.

In particular, it is desirable to accommodate differential thermal expansion between the inner support and the outer support while still providing sealing between circumferentially extending portions of the stator vane and the adjacent supporting structure while allowing the vane to tilt in the axial direction to accommodate differences in axial growth and to slide in the radial direction to accommodate differences in radial expansion. In addition, it is desirable to divert cooling air which passes along leak paths extending between the stator vane and the adjacent stator structure to more useful purposes than flowing directly into the working medium flow path and to decrease the size of these leak paths all while accommodating differences in axial and radial growth between the inner support and the outer support for the array of stator vanes.

DISCLOSURE OF INVENTION

According to the present invention, each vane of an array of stator vanes is bolted to an inner support at a downstream inner flange, is radially splined to prevent movement in the circumferential direction at an upstream flange which is spaced axially from the downstream flange and is adapted to slidably engage the outer support structure at a third surface which extends circumferentially in sealing contact with an adjacent stator structure.

In accordance with one embodiment, the third surface is on a third flange.

In accordance with one embodiment of the invention, the third flange is a downstream outer flange which extends circumferentially about the vane to slidably engage the vane in the radial direction and is urged rearwardly against the support to provide sealing contact in the circumferential direction at the rear of the flange.

A primary feature of the present invention is a stator vane which is bolted securely to an inner support. Another feature is a spline-type connection between the outer support and an upstream flange in the vane. In one embodiment, the spline-type connection is on the opposite side of the vane from the bolted connection in the downstream inner flange. In one embodiment, a downstream outer flange extends circumferentially, and the upstream support is adapted by an annular groove to receive the downstream outer flange. The downstream outer flange has a downstream surface which adapts the support to sealingly engage the downstream flange of the stator vane. In another embodiment, a circumferentially extending ring which overlaps the adjacent vane flanges presses sealingly against the downstream inner flange and extends between adjacent bolts to provide an axial restraint across the circumference of the flange.

A primary advantage of the present invention is the engine efficiency which results from restraining the vane against rotation in response to operative forces to avoid the creation of leak paths between circumferentially extending surfaces on the vane and circumferentially extending sealing surfaces which engage the vane. Another advantage is the service life of the vane which results from rigidly supporting the vane while permitting axial and radial growth between the inner and outer support between which the vane extends while decreasing the effect that spline-type connections have on the ability of the vane to rotate by spacing axially the spline-type connection from the point of rotation.

The foregoing features and advantages of the present invention will become more apparent in light of the following detailed description of the best mode for carrying out the invention and in the accompanying drawings.

BRIEF DESCRIPTION OF DRAWINGS

FIG. 4 is a view taken generally along the lines 4—4 of FIG. 2 to show a stator vane in full and the adjacent structure before operation of the engine to show the stator vane in phantom during operative conditions of the engine and to shown a stator vane with the broken lines that is an embodiment of a construction which does not practice the present invention.

FIG. 5 is a schematic representation showing how the loction at which a given set of tolerances is applied can effect the rotation of the vane about the point A.

BESTS MODE FOR CARRYING OUT THE INVENTION

Figure 1:
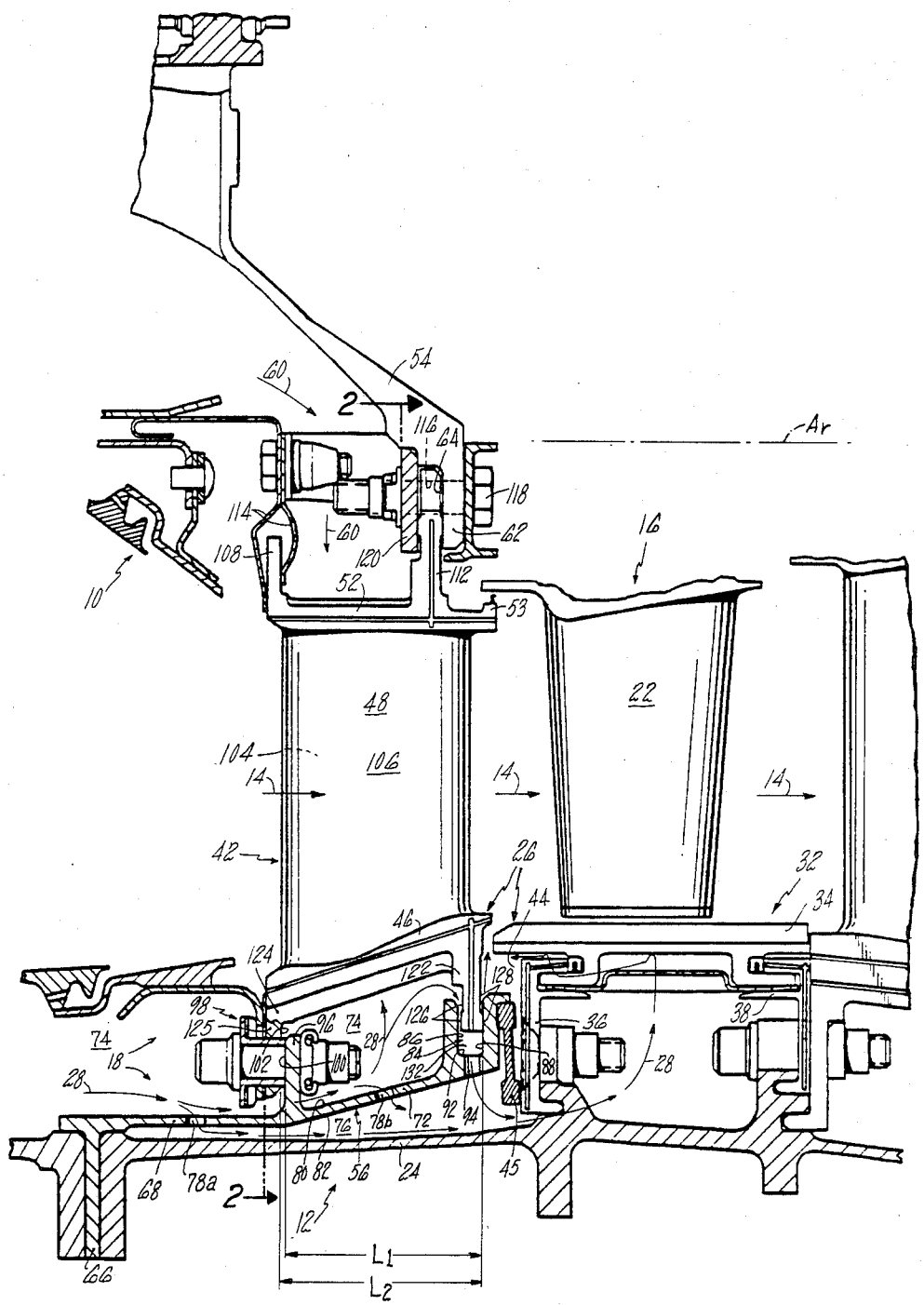
FIG. 1 is a cross sectional view of a gas turbine engine showing a portion of the combustion section and the turbine section.

FIG. 1 is a cross sectional view of a gas turbine engine embodiment of the present invention showing a portion of a combustion section 10 and a portion of the turbine section 12. The combustion section and the turbine section are disposed about an axis of rotation $A_r$. An annular flow path 14 for working medium gases extends through the engine about the axis of rotation $A_r$. A rotor assembly 16 also extends axially through the engine about the axis of rotation. A stator assembly 18 extends axially through the engine about the rotor assembly.

In the turbine section 12, the rotor assembly 16 includes an array of rotor blades as represented by the single rotor blade 22. The array of rotor blades extends outwardly across the working medium flow path. The stator assembly includes an engine case 24 which extends circumferentially about the working medium flow path and a wall 26 which is spaced inwardly from the engine case. At least one primary flow path for cooling air, as represented by the flow path 28, extends axially throuh the engine between the wall and the engine case.

The wall 26 extends circumferentially about the working medium flow path in close proximity to the rotor blades 22 to outwardly bound the working medium flow path. The wall includes an outer air seal 32 which extends circumferentially about the rotor blades 22. The outer air seal is formed of an array of arcuate seal segments, as represented by the single seal segment 34, which extends circumferentially about the array of rotor blades. An upstream support 36 and a downstream support 38 extend inwardly from the engine case 24 to support and position the outer air seal in close proximity to the array of rotor blades. Each of these supports may be segmented to reduce the hoop strength of the supports.

The wall 26 includes an array of stator vanes, as represented by the single stator vane 42, which extends inwardly across the working medium flow path 14. The array of stator vanes is adjacent to the outer air seal and is spaced from the outer air seal to leave a region 44 therebetween which is radially outwardly of the working medium flow path. An annular spring seal 45 extends between the upstream support 36 for the outer air seal and the array of stator vanes to block the leakage of cooling air from the primary flow path for cooling air 28.

Each stator vane 42 has a platform 46, one or more airfoils 48 which extend radially inwardly across the working medium flow path, and a shroud 52 which is fixed to the airfoil. The shroud 52 has a knife edge seal 53 which extends radially inwardly into close proximity with the rotor blades to block the leakage of working medium gases from the working medium flow path.

The stator assembly further includes a means for supporting the array of stator vanes, such as the inner support 54 and the outer support 56. The inner support is attached through an intermediate member and other members (not shown) to the engine case 24. The inner support is spaced inwardly from the combustion section and extends circumferentially with respect to the combustion section to define an inner flow path for cooling air 60. The inner support includes an annular plate 62 which extends circumferentially about the working medium flow path 14. The inner plate has a radially extending surface 64 which faces in the upstream direction and adapts the support to engage the stator vane 42.

The outer support 56 is annular and has an annular flange 66, a cylindrical section 68, and a frustoconical section 72. These sections are integral with each other and form an integral construction. The integral construction results from the one piece construction of the outer support. Alternatively it might result from a design of the support that causes the support to act as a single piece.

The outer support 56 extends axially and radially inwardly from the engine case 24 to divide the primary flow path for cooling air into a high pressure region 74 having cooling air at a static pressure and a low pressure region 76 having cooling air at a lesser static pressure. A plurality of metering holes 78a and 78b place the high pressure region in flow communication with the low pressure region. The annular support is adapted by a first surface 80 to bound the high pressure region formed by the upstream portion of the primary flow path for cooling air and by a second surface 82 to bound the adjacent low pressure region formed by the downstream portion of the primary flow path for cooling air.

The annular outer support 56 supports the stator vanes 42 in cantilevered fashion from the engine case. The outer support has an annular groove 84 which faces inwardly. The groove is bounded by a pair of radially extending surfaces 86 and 88 which are spaced one from the other and an axially extending surface 92. The upstream radial surface 86 faces downstream, the downstream radial surface 88 faces upstream, and the axially extending surface 92 faces radially inwardly. A plurality of orifices 94 extend through the support to place the annular groove in flow communication with the low pressure region 76.

The outer support 56 further includes a plurality of upstream flanges 96 which are circumferentially spaced one from the another. These flanges are each adapted to engage a stator vane 42 of the array of stator vanes at a spline-type connection 98. Each flange has an upstream face 100. The upstream face 100 is spaced axially from the downstream face 88 bounding the annular groove 84 by an axial distance $L_1$. The vane has a downstream face 102 which is spaced a distance $L_2$ from the downstream face 88. The distance $L_2$ is greater than the distance $L_1$ to ensure that an axial gap exists between the flange and the vane as the vane moves rearwardly to abuttingly engage the downstream face 88.

Each stator vane 42 of the array of stator vanes extends between the inner support 54 and the outer support 56. Each vane has a suction side 104 and a pressure side 106. The inner shroud 52 has an upstream inner flange 108 and a downstream inner flange 112. These flanges extend circumferentially about the vane. As shown, the upstream inner flange engages a flexible, sheet metal seal 114 which is attached to the inner support and which extends circumferentially to sealingly engage the downstream inner flange to block the leakage of cooling air from the inner flow path for cooling air 60.

The downstream inner flange 112 is adapted by a hole 116 to receive a fastener, such as the nut and bolt combination 118. A circumferentially extending, complete ring 120 extends over the inner flange of each vane and traps the inner flange in the axial direction between the ring and the annular plate 62 on the inner support 54.

Each stator vane 42 is adapted to engage the outer support by flanges, such as a downstream outer flange 122 and a upstream outer flange 124. The upstream outer flange is spaced radially outwardly from the downstream inner flange and is spaced axially forwardly from the downstream inner and outer flanges. The upstream outer flange is adapted by a groove 125 to slidably engage the upstream flange 96 on the outer support through the spline-type connection 98. The downstream outer flange is spaced radially outwardly from the downstream inner flange and axially rearwardly by a small distance. The downstream outer flange extends circumferentially in the annular groove 84. The downstream outer flange has a pair of radial surfaces 126 and 128. The upstream radial surface 126 faces in the upstream direction and the downstream radial surface 128 faces in the downstream direction. An axial surface 132 extends between these radial faces and is spaced radially from the axial surface 92 in the groove to leave an annular intermediate chamber 132 therebetween. The annular intermediate chamber is in flow communication with the second low pressure region 76 for cooling air through the orifices 94 in the outer support. Because of tolerances between the groove and the faces on the downstream outer flange, a small gap exists between the upstream facing radial surface 126 on the flange.

Figure 2:
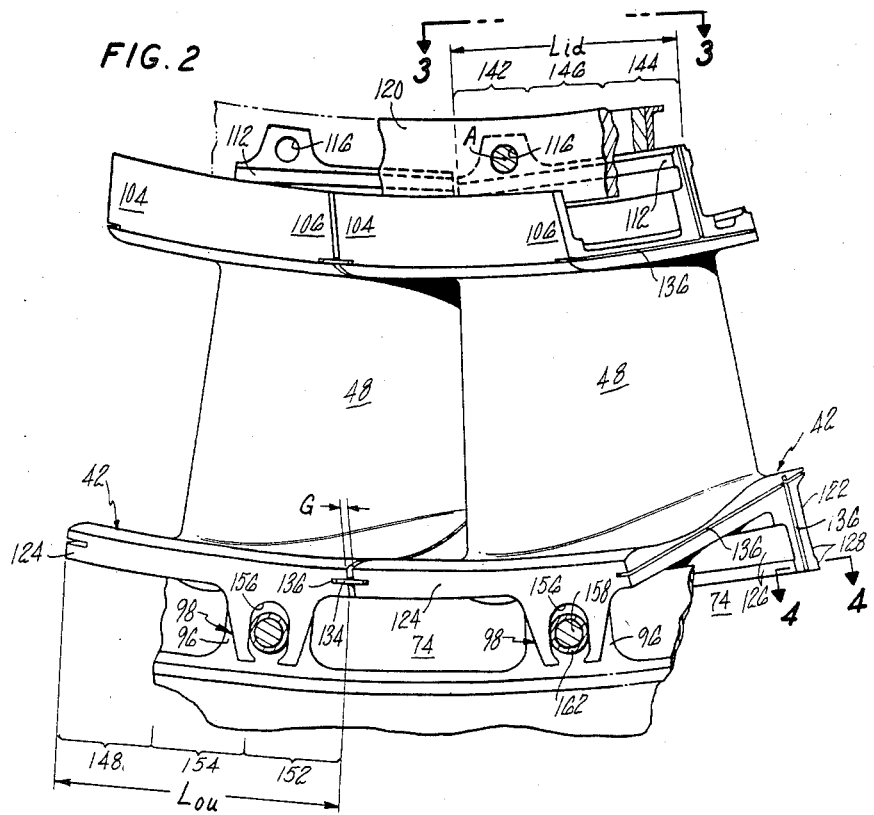
FIG. 2 is a front view taken generally along the lines 2—2 of FIG. 1 with portions of the combustion section and turbine section broken away from clarity.

FIG. 2 is a front elevation view of a pair of adjacent stator vanes 42 with portions of the combustion section 10 and sheet metal seal 114 broken away for clarity. The circumferentially extending ring 120 is also broken away to shown the relationship of the ring to the downstream inner flange of the adjacent vane. As shown in phantom, the ring extends over each inner flange such that a bolt through each of the holes 116 in the adjacent downstream inner flanges 112 causes the ring to exert a clamping action not only at the bolt location, but also over those portions of the downstream inner flange which extend between the adjacent bolt locations.

The adjacent vanes are spaced circumferentially leaving a small circumferential gap G therebetween to accommodate changes in the diameter of the array of stator vanes. Flexible seal plates 134 (feather seals) which extend in the feather seal grooves 136 shown in FIG. 1 and FIG. 2 extend between the adjacent inner shrouds, the adjacent platforms and the adjacent downstream outer flanges to block the leakage of cooling air from these locations.

Each downstream inner flange 112 extends circumferentially about the stator vane 42 with a circumferential length $L_{id}$. This circumferential length is divided into three sections each having a length which is approximately equal to the length of the adjacent sections. The downstream inner flange has a first section 142 which is adjacent to the suction side 104 of the vane. A second section 144 is adjacent to the pressure side 106. A central section 146 extends between the first section and the second section. The first section is adapted by the hole 116 in the downstream inner flange to receive the nut and bolt combination 118. As will be realized, this nut and bolt connection restrains the inner flange against axial, circumferential, and radial movement of the stator vane at a first point, point A.

The upstream outer flange 124 extends circumferentially about the stator vane with a circumferential length $L_{ou}$. Like the downstream inner flange 112, the upstream outer flange has a first section 148 which is adjacent to the suction side 104 of the vane. The flange also has a second section 152 which is adjacent to the pressure side 106 of the vane. A central section 154 extends between the first section and the second section. The second section is adapted to engage one of the upstream flanges 96 on the outer support through the spline-type connection by a radially extending slot 156. The vane is free to slidably engage the outer support in the radial direction through the spline-type connection and to abuttingly engage the outer support in the circumferential direction. As will be realized, the spline-type connection 98 includes a pin 158 and bushing 162 configuration which acts an enlarged pin. The pin is fixed to the upstream flange 96 on the outer support 56 and extends into the radial slot. Alternatively, the spline-type connection might be formed with a pin fixed to the vane which engages a slot in the flange. As shown, the pin is provided with a bolt 164 and a spring 165. The spring is compressed during installation to urge the vane rearwardly against the downstream surface 88 of the annular groove 84.

Figure 3:
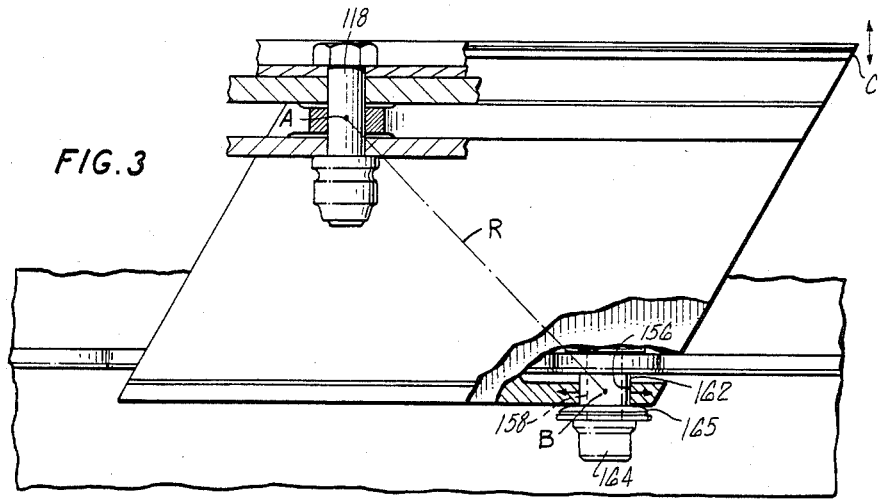
FIG. 3 is a view taken generally along the lines 3—3 of FIG. 2 of one of the adjacent pair of stator vanes with portions of the remaining stator vane broken away to show the relative location of the bolted rear connection to the spline-type front connection of the stator vane.

FIG. 3 is a view taken along the lines 3—3 of FIG. 2 showing the relationship of the fastener 118 in the downstream inner flange at a first point A to the the spline-type connection 98 formed by the combination of the pin 158 and the radial slot 156 at a second point B. These two devices are the primary means for restraining the vane against circumferential movement. Because of required tolerances at the spline-type connection between the pin and the slot, the vane is permitted a small amount of circumferential movement at point B. This small amount of circumferential movement results in rotation of the vane about the first point A with a radius having a horizontal component which is approximately equal to R. As will be realized, this movement at B is reflected in a fore and aft movement of the vane. This includes fore and aft movement of the dowstram outer flange 122 at point C.

FIG. 4 is a view of the downstream outer flange 122 taken along the lines 4—4 of FIG. 2 with the adjacent structure to the relationship of this flange to the annular groove 84. As the vane rotates about point A, the downstream flange 122 rotates at point C and a small triangular leak area (which is exaggerated for clarity) opens between the downstream radial surface 128 on the flange and the radial surface 88 on the groove which faces in the upstream direction.

During operation of the gas turbine engine, cooling air is flowed along the primary flow path 28 into the first, high pressure region 74. The high pressure region is a first cavity or chamber which extends circumferentially beneath the array of coolable stator vanes 42 to supply cooling air to the stator vanes. In addition, the primary flow path extends into the second low pressure region 76 which is radially outwardly of the annular outer support 56. The second region is bounded by the upstream support, outer air seal 32 and the spring seal 45 which extends between the outer support and the upstream support 36. Components of the turbine section, including the inner support, the outer support, the outer case, the array of stator vanes, and the outer air seal are heated by the working medium gases and cooled by the cooling air.

These components of the engine respond thermally at different rates to heating by the working medium gases and to cooling by the cooling air. Factors effecting their thermal response include the thermal capacitance of the components and the exposure of the components to hot gases and to cooling air. For example, components such as the array of stator vanes 42 are in intimate contact with the working medium flow path and respond more rapidly then does the outer case 24 and the supports 54, 56 which are spaced from the working medium flow path 14 and bathed in cooling air. As a result, the outer support and the inner support and the array of stator vanes grow axially and radially at different rates in response to changes in gas path temperature. For example, the inner support and the outer support may move radially and axially with respect to each other causing the vane to tilt in the fore and aft direction. This radial and axial movement is accommodated by the axial clearance $C_a$ between the downstream outer flange 122 and the radial surface 86 of the annular groove 84, by the radially slidable engagement between the flanges of the stator vanes and the outer support and by the ability of the vanes to make small adjustments rearwardly in response to operative forces acting on the array of stator vanes which are exerted by the working medium gases as they flow through the vanes. Because the distance $L_1$ between the rear surface 88 of the annular groove and the upstream face 100 of the outer flange is smaller than the distance between the rear surface 128 of the downstream outer flange 122 and the rear surface of the upstream outer flange 124, the vane moves axially rearwardly in response to operative forces to press sealingly against the rear surface 126 of the annular groove. Nevertheless, operative forces exerted by the working medium gases also act to cause the vane to rotate away from the rear surface wich is resisted by the circumferential restraint of the spline-type connection 98 and the fastener 118 at the downstream inner flange.

A particular advantage of the present invention is the radius which exists between the point of circumferential restraint at the inner flange and the point of circumferential restraint at the outer flange. As a result of the radius R which exists between these two locations, tolerances at the spline connection have a lesser effect than if the vane were splined to the outer case at a point which is radially outward of the inner flange.

FIG. 5 is a simplified illustration of the effect of tolerances in the circumferential direction on the ability of the vane to move about the point of rotation A. If the tolerances providing circumferential restraint are applied at a point which is circumferentially aligned and in close axial alignment to the point A, such as the point B', then the vane is free to move about the point A through an angle alpha. If the point of circumferential restraint is moved axially or axially or circumferentially from the point B' to a point B to space the point of circumferential restraint axially and circumferentially from the point of rotation A, the angle through which the vane can rotate is much smaller and is approximated by the angle beta. An additional benefit is realized by using an axially extending pin 158 which is at an angle to the radius R. This further reduces the effect of tolerances.

The impact of decreasing these angles is shown in FIG. 4 where the solid line configuration shows the ideal sealing contact between the rearwardly facing surface 128 of the downstream outer flange 122 and the upstream facing surface 88 of the annular groove. Rotation of the vane in a circumferential direction about the point A through the angle alpha causes the maximum triangular leak path to open up between the flange surface 128' and the groove as shown by the broken lines. Axially moving the point of circumferential restraint forwardly from the point of circumferential restraint at the downstream inner flange further reduces the angle and moving the flange axially and circumferentially with respect to the point of downstream location decreases the angle even further and results in movement to a location shown by the phantom line. The same beneficial effect occurs at other locations where a circumferentially extending sealing surface on the flange engages an associated surface on a seal such as between the upstream inner flange 108 and the adjacent sheet metal seal 114.

The leak path for cooling air extends from the first high pressure region past the upstream axial clearance $C_a$ which is provided to accommodate axial tilting of the vane with respect to the outer support. The leak path extends into the intermediate chamber, and thence between the downstream surface 128 of the flange and the upstream surface 88 of the support. The leakage is greatly decreased for the location of the flange shown in phantom through the large reduction in leakage area as compared to the location of the flange shown by the broken lines.

A further benefit is realized from tightly sealing the intermediate chamber. As the intermediate chamber is pressurized by the flow of cooling air along the leak path, the cooling air is bled off from this location back into the primary flow path through the orifices 94 which extend from the intermediate chamber to the low pressure region 76 of the primary flow path. This diverts a portion of the cooling air flowing along the leak path to the working medium flow path. Secondly, it decreases the driving force (that is, pressure gradient) between the intermediate chamber and the working medium flow path by decreasing the pressure of the intermediate chamber. The primary flow path extends rearwardly between the adjacent upstream supports 36 and through the outer air seal 32 where it provides cooling to the outer air seal. The air may be exhausted into a third region, such as the region 44 outwardly of the flow path between the outer air seal and the vanes where it pressurizes the region. Accordingly, the cooling air is diverted from a leak path to a region of the engine where it may be usefully employed and returned to the leak region where it serves to pressurize that region further decreasing the gradient between the intermediate cavity and the leak region.

Finally, the fastener 118 serves to securely restrain the vane against radial movement, locating the vanes radially with respect to each other and to the adjacent static and rotating structure. Locating the vanes radially with respect to each other assures the correct alignment of feather seal grooves which extend between adjacent vanes. Locating the vanes with respect to the rotating structure allows for the precisely locating of the knife edge seal 53 with respect to the rotating array of rotor blades to ensure that adequate sealing is provided to the working medium flow path without destructive interference between the knife edge and the rotating structure.

Although the invention has been shown and described with respect to detailed embodiments thereof, it should be understood by those skilled in the art that various changes in form and detail thereof may be made without departing from the spirit and the scope of the claimed invention.

I claim:

1. A stator assembly for a rotary machine having an annular flow path for working medium gases, an inner support inwardly of the flow path and an outer support outwardly of the flow path, which comprises:
   an array of stator vanes extending between the inner support and the outer support, at least one of which has
      a downstream inner flange which is adapted to be attached to the inner support to restrain the vane against axial, radial and circumferential movement;
      a downstream outer flange spaced radially from the downstream inner flange which abuttingly engages the outer support in the axial direction and slidably engages the outer support in the radial direction;
      an upstream outer flange spaced axially from the downstream outer and inner flanges which slidably engages the outer support in the radial direction and which is adapted to abuttingly engage the outer support in the circumferential direction;
   means for restraining each vane against axial, radial and circumferential movement which includes
      a means for attaching the downstream inner flange to the inner support to restrain the vane against axial, radial and circumferential movement, and
      a means for restraining the vane against circumferential movement which engages the upstream outer flange and the outer support.

2. The stator assembly of claim 1 wherein the downstream outer support has a circumferentially extending surface and the downstream outer flange has a circumferentially extending surface facing the surface on the support which is adapted to slidably engage the surface on the support in the radial direction to permit relative movement and abuttingly engage the surface in the axial direction to provide sealing in response to operative conditions of the engine.

3. The stator assembly of claim 2 wherein the means for restraining the upstream support against circumferential movement includes a means for urging the vane axially rearwardly.

4. A stator assembly for a gas turbine engine having an annular flow path for working medium gases, an inner support inwardly of the flow path and an outer support outwardly of the flow path, which comprises:
   an array of stator vanes extending between the inner support structure and the outer support structure, the array of stator vanes including a pair of stator vanes which each have
      a first side,
      a second side,
      a downstream inner flange which is adapted to be attached at a first point adjacent to the first side of the vane to the inner support;
      a downstream outer flange spaced radially from the downstream inner flange which is adapted to abuttingly engage the downstream support in the axial direction and slidable engage the outer support in the radial direction;

an upstream outer flange spaced axially from the downstream outer and inner flanges which is adapted at a second point adjacent to the second side of the vane to slidably engage the outer support in the radial direction and to abuttingly engage the outer case in the circumferential direction;

means for restraining each vane against axial, radial and circumferential movement which includes a ring which overlaps the inner flange of the adjacent vanes to trap the inner flanges axially between the ring and the inner support, a bolt at each first point for urging the ring against the vanes at each first point and restraining the vane against radial and circumferential movement and a spline-type connection between the vane and the upstream support for permitting the vane to slidably engage the outer support in the radial direction and to abutting engage the outer support in the circumferential direction;

wherein the distance between the first point and the second point decreases the effect on vane rotation about the first point that results from tolerances in the circumferentially abutting engagement at the second point.

5. A stator assembly for a gas turbine engine having an annular flow path for working medium gases, which comprises:

an inner support which extends circumferentially about the working medium flow path and which has a radially extending surface which faces in the upstream direction;

a one-piece annular outer support which extends axially and inwardly from an engine case and which is adapted to divide the flow path for cooling air into a high pressure region and a low pressure region, the annular support having an annular groove which faces inwardly, and, a radially extending surface facing in the upstream direction which bounds the groove, and, a plurality of circumferentially spaced upstream flanges which are each adapted to engage the array of stator vanes at a spline-type connection;

an array of stator vanes extending between the inner support and the outer support, each of the vanes having a suction side, a pressure side, a downstream inner flange which extends circumferentially about the vane with a circumferential length Lid, the flange having a first section adjacent to a first side of one of said sides, a second section adjacent to the second side of said sides and a central section extending between the first section and the second section, the sections being approximately equal in circumferential length, the first section being adapted by a hole to receive a fastener;

a downstream outer flange which is spaced radially from the downstream inner flange, which extends circumferentially in the annular groove to slidably engage the outer support in the radial direction and which has a surface which is adapted to abuttingly engage the radially facing surface bounding the groove, the flange being spaced radially in the groove from the support to leave an annular intermediate chamber therebetween;

an upstream outer flange which extends circumferentially about the flange with a circumferential length Lou, the flange having a first section on the first side of the vane, a second section on the second side and a central section extending between the first section and the second section, the sections being approximately equal in circumferential length, the second section being adapted to engage one of said upstream flanges at a spline-type connection;

means for restraining each vane against axial, radial and circumferential movement which includes a circumferentially continuous ring which overlaps the inner flange of the adjacent vanes to trap the inner flanges axially between the ring and the inner support, a fastener at each first section for urging the ring axially against the vanes to restrain the vanes against axial movement and for restraining the vane against radial and circumferential movement, and, a spline-type connection between the second section of the upstream flange and the upstream support for permitting the vane to slidably engage the outer support in the radial direction and to abuttingly engage the outer support in the circumferential direction;

wherein a leak path for cooling air extends from the first cavity past the flanges to the intermediate chamber, and thence between the rear of the flanges and the support to the working medium flow path and wherein the axial distance between the first section on the inner downstream flange and the second section on the outer upstream flange decreases the effect on vane rotation about the first point that results from tolerances in the circumferentially abutting engagement at the second point and decreases the leakage area between the downstream surface and the outer flange and the sealing surface on the groove to decrease leakage through the intermediate chamber.

* * * * *